No. 881,581. PATENTED MAR. 10, 1908.
A. HESSEMER.
CAR FENDER.
APPLICATION FILED DEC. 5, 1907.
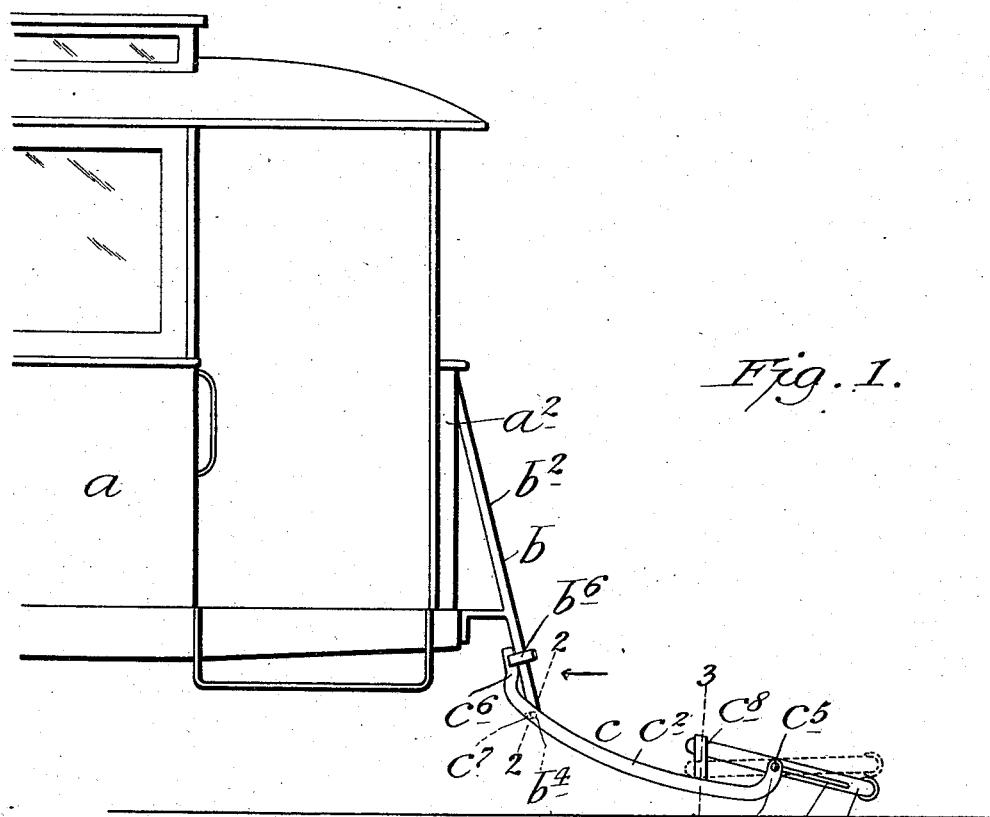
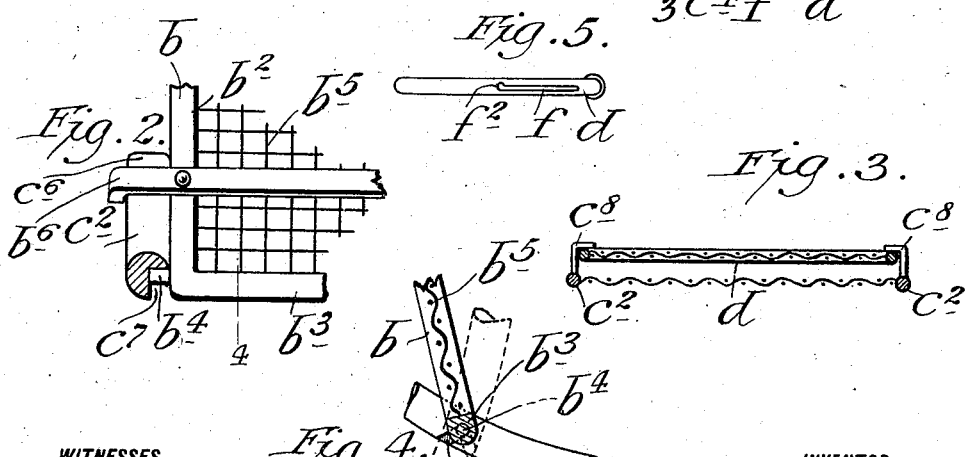
WITNESSES
INVENTOR,
Adam Hessemer,
BY Edgar Tate & Co.
ATTORNEYS.

UNITED STATES PATENT OFFICE.

ADAM HESSEMER, OF BROOKLYN, NEW YORK.

CAR-FENDER.

No. 881,581.     Specification of Letters Patent.     Patented March 10, 1908.

Application filed December 5, 1907. Serial No. 405,169.

*To all whom it may concern:*

Be it known that I, ADAM HESSEMER, a citizen of the United States, and residing at Brooklyn, in the county of Kings and State of New York, have invented certain new and useful Improvements in Car-Fenders, of which the following is a specification, such as will enable those skilled in the art to which it appertains to make and use the same.

The object of this invention is to provide an improved car fender or guard for tramway cars which is simple in construction and operation and by means of which the sometimes fatal accidents which result from a party being struck by the fender or guard may be obviated, the construction and operation of the fender or guard being such that the party or person struck will be caught thereon and prevented from passing under the car; and with this and other objects in view the invention consists in a car fender or guard constructed as hereinafter described and claimed.

The invention is fully disclosed in the following specification, of which the accompanying drawing forms a part, in which the separate parts of my improvement are designated by suitable reference characters in each of the views, and in which:—

Figure 1 is a side view of the front end portion of a car provided with my improved fender or guard; Fig. 2 a section of one side of the guard on the line 2—2 of Fig. 1; Fig. 3 a section on the line 3—3 of Fig. 1; Fig. 4 a section on the line 4—4 of Fig. 2; and Fig. 5 a side view of one part of the fender or guard.

In the drawing forming part of this specification, I have shown at $a$ one end portion of a car provided with the usual dashboard $a^2$, and in the practice of my invention, I secure to the end of the car in any desired manner a frame $b$ which extends downwardly and forwardly below the bottom of the car and which, in the construction shown, is rectangular in form, and comprised of side members $b^2$, a bottom member $b^3$, and an open wire work body portion $b^5$. The frame $b$ is provided at its lower opposite corners with laterally directed pins $b^4$, and my improved fender or guard also involves a main movable frame or member $c$ and a supplemental movable frame or member $d$. The main movable frame or member $c$ is composed of two similar side parts $c^2$, provided at their forward ends with upwardly directed bearings $c^4$ through which passes a transverse rod $c^5$ on which the frame member $d$ is mounted.

The rear end portion of the side members of the frame $c$ are curved upwardly as shown at $c^6$ and bear on the back of hook members $b^6$ secured to the frame $b$, and the side portions $c^2$ of the frame member $c$ are provided with downwardly ranging grooves or recesses $c^7$ adapted to receive the pins $b^4$ of the frame $b$.

The fender or guard frame member $d$ is mounted on the rod $c^5$ and that part thereof extending forwardly of said rod is slightly longer than the rearwardly directed portion thereof, as shown, and the side parts $c^2$ of the fender or guard frame member $c$ are provided with upwardly directed catches or keepers $c^8$ which overlap the rear end side portions of the frame member $d$ and normally hold it in the position shown in full lines in Fig. 1. Both ends of the frame member $d$ may be of the same length however, or the front end thereof may be a little shorter than the rear end, and in either of these events it will be necessary to weight the front end so that it will be held by gravity in the operative position shown in full lines in Fig. 1.

The fender or guard is normally held at a predetermined distance above the ground, preferably about two inches, but in the operation of the car, when it is loaded, there is a vertical movement of the end portions of the car and of the fender which will, at times, bring the fender or guard in contact with the track or ground, and the bottom of the frame members $c$ and $d$ may be provided with rollers if desired as in other devices of this class.

The pins $b^4$ form a pivotal support for the frame member $c$ of the fender or guard, and the said fender or guard may be folded upwardly when desired and rest against the dashboard in the usual manner, or said fender or guard may be detached and connected with the opposite end of the car whenever desired, it being understood that each end of the car is provided with a frame $b$.

In detaching the fender or guard from the frame $b$ all that is necessary is to lift the parts $c$ and $d$ up so that the pins $b^4$ will come out of the slots or recesses $c^7$.

In the operation of the car, the frame member $d$ of the fender or guard is held normally, by gravity, in the position shown in full lines in Fig. 1, and if a person should be struck by the fender or guard such person would fall backwardly onto the rear portion of the frame member $d$ and onto the frame member $c$ of the fender or guard and the part $d$ would be thrown into the position shown in dotted lines in Fig. 1.

The side portions of the frame member $d$ of the fender or guard are provided with longitudinal slots $f$ and the rod $c^5$ passes therethrough, and the side parts of the frame member $d$ are provided above the slots $f$ and at the inner ends thereof with recesses $f^2$ which communicate with said slots, and when the device is in operation, the rod $c^5$ rests in the recesses $f^2$, and when it is desired to fold the fender or guard upwardly the frame member $d$ is moved backwardly until the rod $c^5$ rests in the opposite ends of the slots $f$, and with this construction the separate parts of the fender or guard may be folded more compactly as will be readily understood and will not extend above the top of the dashboard $a^2$.

Having fully described my invention, what I claim as new and desire to secure by Letters Patent, is:—

1. A fender or guard for cars, comprising a stationary frame member secured to the end body portion of the car and ranging downwardly and outwardly therefrom and below the bottom thereof, a movable fender or guard frame detachably pivoted at the lower end of the stationary frame member and normally ranging forwardly and downwardly therefrom, means for holding said fender or guard frame in a predetermined position, and a supplemental fender or guard frame pivotally and slidably mounted on the front end of the main movable fender or guard frame and extending forwardly thereof and backwardly of its pivotal support and normally held in a downwardly and forwardly directed position, and adapted to be moved backwardly and tilted into a backwardly and downwardly directed position, substantially as shown and described.

2. A fender or guard for cars, comprising a stationary frame member secured to the end body portion of the car and ranging downwardly and outwardly therefrom and below the bottom thereof, a movable fender or guard frame detachably pivoted at the lower end of the stationary frame member and normally ranging forwardly and downwardly therefrom, means for holding said fender or guard frame in a predetermined position, and a supplemental fender or guard frame pivotally and slidably mounted on the front end of the main movable fender or guard frame and extending forwardly thereof and backwardly of its pivotal support and normally held in a downwardly and forwardly directed position, and adapted to be moved backwardly and tilted into a backwardly and downwardly directed position, all of said frame members being provided with open-work body portions, substantially as shown and described.

In testimony that I claim the foregoing as my invention I have signed my name in presence of the subscribing witnesses this 3rd day of December 1907.

ADAM HESSEMER.

Witnesses:
C. E. MULREANY,
M. E. DOODY.